(12) United States Patent
Higashi (10) Patent No.: US 11,467,762 B2
(45) Date of Patent: Oct. 11, 2022

(54) DATA BUS INVERSION (DBI) IN A MEMORY SYSTEM, CONTROLLER AND DATA TRANSFER METHOD

(71) Applicant: Kioxia Corporation, Minato-ku (JP)

(72) Inventor: Hirotaka Higashi, Kawasaki (JP)

(73) Assignee: Kioxia Corporation, Minato-ku (JP)

( * ) Notice: Subject to any disclaimer, the term of this patent is extended or adjusted under 35 U.S.C. 154(b) by 0 days.

(21) Appl. No.: 16/802,631

(22) Filed: Feb. 27, 2020

(65) Prior Publication Data
US 2021/0081133 A1 Mar. 18, 2021

(30) Foreign Application Priority Data
Sep. 13, 2019 (JP) .............................. JP2019-167660

(51) Int. Cl.
*G06F 3/06* (2006.01)
*G06F 1/04* (2006.01)

(52) U.S. Cl.
CPC .............. *G06F 3/0653* (2013.01); *G06F 1/04* (2013.01); *G06F 3/061* (2013.01); *G06F 3/0614* (2013.01); *G06F 3/0658* (2013.01); *G06F 3/0659* (2013.01); *G06F 3/0674* (2013.01)

(58) Field of Classification Search
CPC .... G06F 3/0653; G06F 3/0614; G06F 3/0659; G06F 3/0674; G06F 3/0658; G06F 3/061; G11C 7/1057; G11C 29/36
See application file for complete search history.

(56) References Cited

U.S. PATENT DOCUMENTS

| | | | | |
|---|---|---|---|---|
| 7,501,963 B1 * | 3/2009 | Hollis | ................... | H03M 5/145 341/55 |
| 8,862,811 B2 * | 10/2014 | Shido | ................... | G11C 7/1012 711/105 |
| 9,058,436 B1 * | 6/2015 | Chiu | ....................... | G06F 13/42 |

(Continued)

FOREIGN PATENT DOCUMENTS

| | | |
|---|---|---|
| JP | 5077806 B2 | 11/2012 |
| JP | 2014-170605 A | 9/2014 |
| JP | 5972549 B2 | 8/2016 |

OTHER PUBLICATIONS

T. M. Hollis, "Data Bus Inversion in High-Speed Memory Applications," in IEEE Transactions on Circuits and Systems II: Express Briefs, vol. 56, No. 4, pp. 300-304, Apr. 2009, doi: 10.1109/TCSII.2009.2015395. (Year: 2009).*

(Continued)

*Primary Examiner* — Khoa D Doan
(74) *Attorney, Agent, or Firm* — Oblon, McClelland, Maier & Neustadt, L.L.P.

(57) ABSTRACT

According to one embodiment, a memory system includes a storage device and a controller. The controller is configured to control data write to the storage device and data read from the storage device based on a request from a host device. The controller is configured to maintain or invert logic of first data that is part of transmit data to be transferred to the storage device by N bits per 1 unit interval (UI) through N data signal lines (N is a natural number of one or more), create second data indicating presence or absence of inversion of the logic of the first data, and transfer the first data and the second data to the storage device through the N data signal lines.

17 Claims, 9 Drawing Sheets

(56) References Cited

U.S. PATENT DOCUMENTS

| | | | | |
|---|---|---|---|---|
| 2011/0153939 A1* | 6/2011 | Choi | ................... | G11C 11/407 |
| | | | | 711/118 |
| 2014/0071743 A1* | 3/2014 | Kim | ................... | G06F 13/4234 |
| | | | | 365/158 |
| 2014/0347940 A1* | 11/2014 | Kang | ................... | G11C 7/1084 |
| | | | | 365/189.05 |
| 2015/0212156 A1* | 7/2015 | Bourstein | ............. | H04L 1/0042 |
| | | | | 714/744 |
| 2015/0356047 A1* | 12/2015 | Ayyapureddi | ........ | H03M 13/31 |
| | | | | 714/752 |

OTHER PUBLICATIONS

J. Lucas, S. Lal and B. Juurlink, "Optimal DC/AC data bus inversion coding," 2018 Design, Automation & Test in Europe Conference & Exhibition (DATE), 2018, pp. 1063-1068. (Year: 2018).*

J. Moon and J. S. Kih, "Fast parallel CRC & DBI calculation for high-speed memories: GDDR5 and DDR4," 2011 IEEE International Symposium of Circuits and Systems (ISCAS), 2011, pp. 317-320, doi: 10.1109/ISCAS.2011.5937565. (Year: 2011).*

\* cited by examiner

DATA BUS INVERSION (DBI) IN A MEMORY SYSTEM, CONTROLLER AND DATA TRANSFER METHOD

CROSS-REFERENCE TO RELATED APPLICATIONS

This application is based upon and claims the benefit of priority from Japanese Patent Application No. 2019-167660, filed Sep. 13, 2019, the entire contents of which are incorporated herein by reference.

FIELD

Embodiments described herein relate generally to a memory system, a controller and a data transfer method.

BACKGROUND

For example, center tapped termination (CTT) is known as an interface termination system for data transmission and reception between a storage device and a controller that controls the storage device in a memory system. Further, a pseudo open drain (POD) is known as an interface termination system capable of reducing power consumption more than the CTT. Furthermore, a data bus inversion (DBI) function is known as a method of saving power when the POD is applied. The DBI function is to invert the logic of part of transmit data so as to decrease the number of transferring L(0) to a data signal line as much as possible (i.e., increasing H(1)) in a POD that is, for example, a pull-up type termination system.

As an example of the DBI function, a case is assumed in which when transmit data are transferred by 8 bits (1 byte) for each clock edge through eight data signal lines, it is determined whether or not the transmit data should be inverted and transferred for every 8 bits on each clock edge. In this case, generally, flag data (DBI data) indicating the presence or absence of inversion is transferred in parallel with the transmit data on the same cycle edge. More specifically, for example, 1-bit flag data are transferred on the same clock edge as 8-bit transmit data.

In order to save power by the DBI function, therefore, an independent data signal line for the DBI function needs to be added to the existing data signal line.

DETAILED DESCRIPTION

Various embodiments will be described hereinafter with reference to the accompanying drawings.

In general, according to one embodiment, a memory system includes a storage device and a controller. The controller is configured to control data write to the storage device and data read from the storage device based on a request from a host device. The controller is configured to: maintain or invert logic of first data that is part of transmit data to be transferred to the storage device by N bits per 1 unit interval (UI) through N data signal lines (N is a natural number of one or more); create second data indicating presence or absence of inversion of the logic of the first data; and transfer the first data and the second data to the storage device through the N data signal lines.

Figure 1:
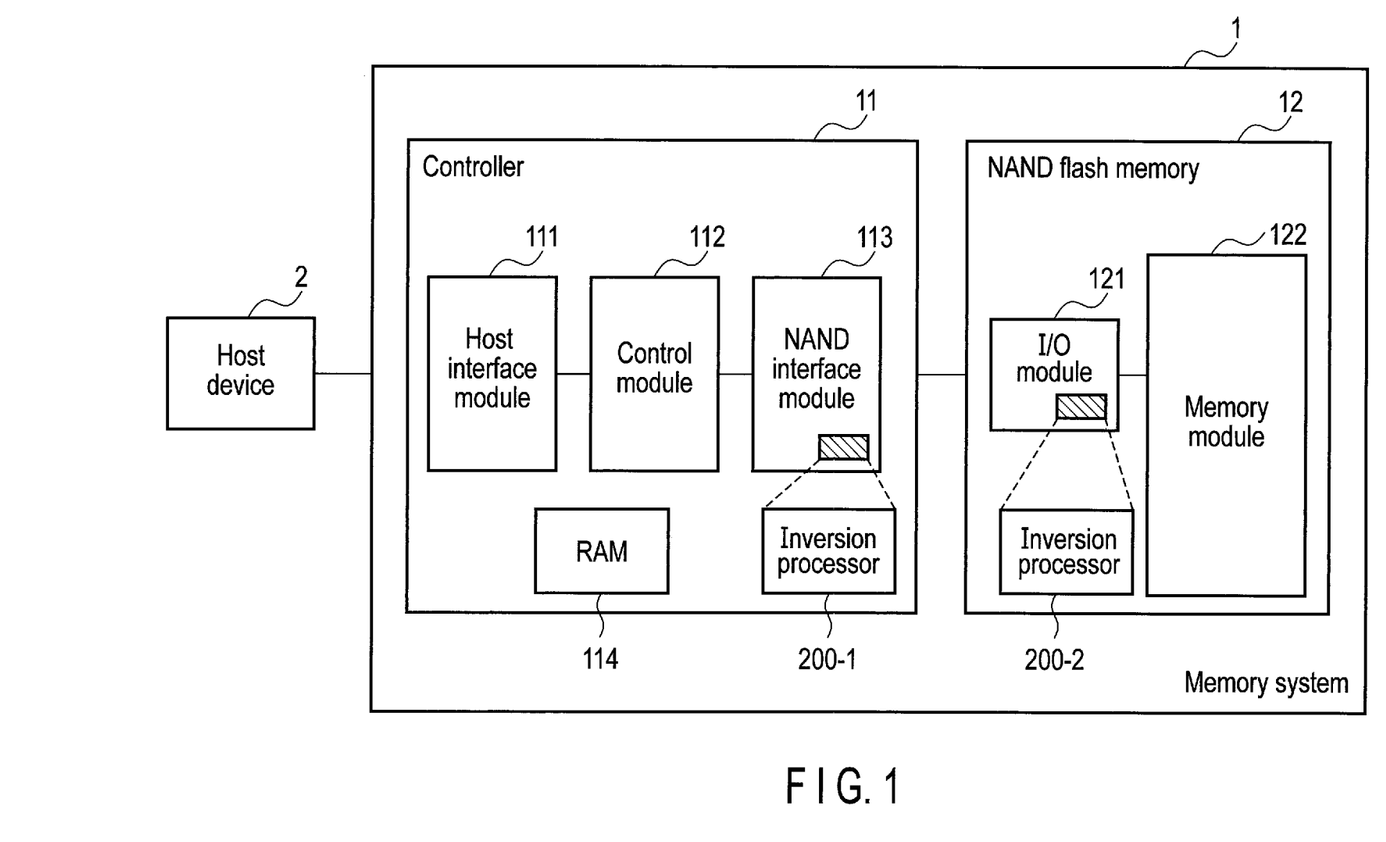
FIG. 1 is a block diagram showing an exemplary configuration of a memory system according to an embodiment.

FIG. 1 is a block diagram showing an exemplary configuration of a memory system 1 according to an embodiment. In this embodiment, the memory system 1 is implemented as a solid state drive (SSD).

The memory system 1, which is an SSD, includes, for example, a controller 11 which is configured as a semiconductor integrated circuit and a NAND flash memory (NAND memory) 12. In the memory system 1, data are written into the NAND memory 12 and data are read from the NAND memory 12 by the controller 11.

The controller 11 includes a host interface module 111, a control module 112, a NAND interface module 113, and a RAM 114. When the memory system 1 is started or reset, the controller 11 loads firmware (program) from the NAND memory 12 into the RAM 114 and executes the loaded firmware, with the result that these modules can be realized. The RAM 114 includes an SDRAM, an SRAM, or other memories.

The host interface module 111 is a module including a circuit that connects the memory system 1 to a host device 2, and controls communications that conform to, e.g., PCIe (registered trademark). The host interface module 111 receives a command from the host device 2. The command received from the host device 2 includes at least a write command requesting to write data and a read command requesting to read data.

The control module 112 receives a command from the host device 2 via the host interface module 111 to perform, for example, data write into the NAND memory 12 or data read from the NAND memory 12, which correspond to the command, via the NAND interface module 113. The control module 112 transmits a result of the processing to the host device 2 via the host interface module 111. The control module 112 also manages a correspondence between a logical address used to specify, by the host device 2, a location on the storage area provided by the memory system 1 and a physical address which indicates the actual location on the NAND memory 12. The correspondence between the logical addresses and the physical addresses is managed by a data structure called a look up table (LUT) or the like. That is, the control module 112 manages this LUT.

In addition, the control module 112 performs a process of eliminating a bias in the number of times of use among memory chips, which is called wearleveling, etc., and a process of reusing an area in which unnecessary data are stored, which is called garbage collection, etc.

The NAND interface module 113 transmits, for example, data requested to be written by the host device 2, to the NAND memory 12 using a data signal line connecting the controller 11 and the NAND memory 12, and receives data requested to be read by the host device 2 from the NAND memory 12. Both the controller 11 and the NAND memory 12 include a predetermined number of terminals connectable to the data signal line. Note that data transmission/reception to/from the NAND memory 12 is not performed only by a request from the host device 2, but may be performed internally by garbage collection when the garbage collection is executed.

The NAND interface module 113 also includes an inversion processor 200 that saves power by a function whose concept is similar to that of the DBI function regarding data transmission and reception between the controller 11 and the NAND memory 12. That is, it is assumed that a POD is applied to the memory system 1 of the present embodiment as a termination system (configuration of data signal lines) of an interface for data transmission and reception between the controller 11 and the NAND memory 12. The inversion processor 200 will be described later. Note that the NAND memory 12 is also provided with an inversion processor 200 that is paired with the inversion processor 200 of the controller 11. In FIG. 1, the inversion processor 200 of the controller 11 is referred to as an inversion processor 200-1 and the inversion processor 200 of the NAND memory 12 is referred to as an inversion processor 200-2.

The NAND memory 12 includes an input/output (IO) module 121 and a memory module 122. The I/O module 121 transmits and receives data to and from the controller 11 (NAND interface module 113). The I/O module 121 includes the inversion processor 200 (200-2) that is paired with the inversion processor 200 (200-1) of the controller 11. The memory module 122 is configured by a plurality of NAND flash memory dies (chips) including a memory cell array capable of storing data in a nonvolatile manner and a peripheral circuit that controls the memory cell array.

Figure 2:
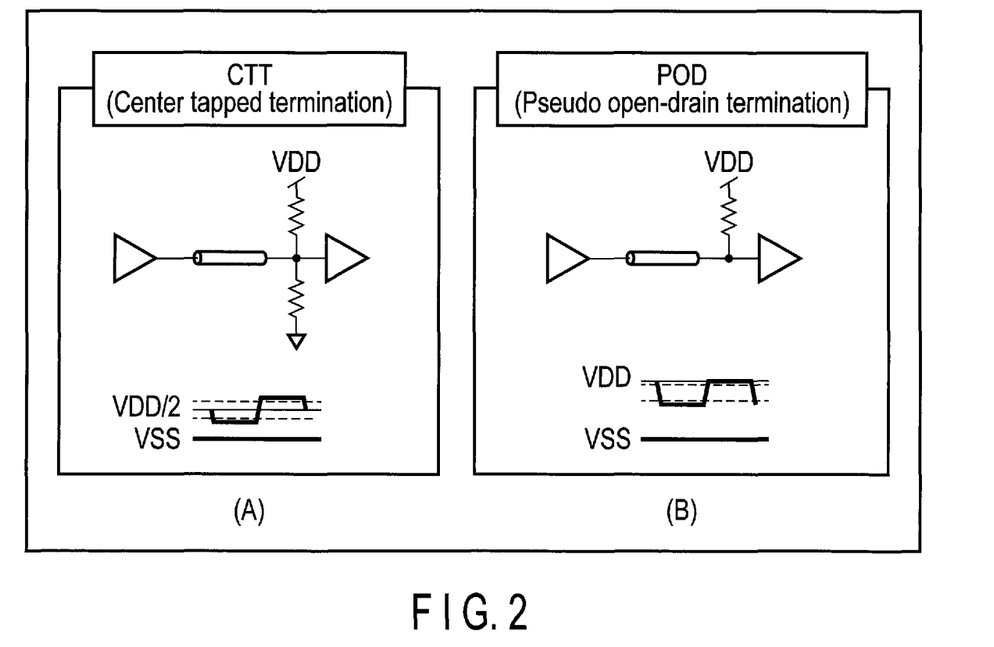
FIG. 2 is a diagram for explaining an outline of a POD to which the memory system according to the embodiment is applied in comparison with CTT.

FIG. 2 is a diagram for explaining an exemplary configuration of an input terminal of a signal line for data transmission and reception between the controller 11 (NAND interface module 113) and the NAND memory 12 (I/O module 121). In FIG. 2, an outline of a POD that is a termination system applied to the memory system 1 of the present embodiment is shown in comparison with CTT that is another termination system.

In FIG. 2, (A) shows an example of the CTT and (B) shows an example of the POD. In the CTT shown in (A) of FIG. 2, a data signal line is pulled up and pulled down to set a steady voltage value, and the voltage value of the data signal is increased to an upper threshold value or more to transfer data "1" and the voltage value thereof is decreased to a lower threshold value or less to transfer data "0". That is, in the CTT, the voltage value of the data signal line needs to be adjusted even when data "0" or "1" are transferred.

In the POD, a data signal line is pulled up, but it may be pulled down (pull-down type). That is, the steady voltage value of the data signal line is set to a value equal to or more than the upper threshold value corresponding to data "1" in a case of the POD (pull-up type) or set to a value equal to or less than the lower threshold value corresponding to data "0" in a case of the pull-down type. In FIG. 2, (B) shows the POD (pull-up type). In the POD, the voltage value of the data signal line need not to be adjusted because the data signal line is pulled up when data "1" are transferred, and the voltage value of the data signal line is adjusted to decrease to the lower threshold value or less when data "0" are transferred. In the pull-down type, the voltage value of the data signal line need not to be adjusted when data "0" are transferred, and the voltage value of the data signal line is adjusted to increase to the upper threshold value or more when data "1" are transferred. That is, the voltage value of the data signal line needs to be adjusted only when one of data "0" in the POD and data "1" in the pull-down type is transferred.

As described above, in the POD that decreases the number of adjusting the voltage value of a data signal more than the CTT, current flows when data "0" are transferred, but no current flows when data "1" are transferred, with the result that power consumption for data transmission and reception can be reduced.

The DBI function that is an example of a power saving method to which the POD is applied will be described with reference to FIG. 3.

Here is a description of an example of transferring transmit data by 8 bits for each clock edge using eight data signal lines DQ0 to DQ7. The valid period of data transferred on one clock edge (between edges preceding and following the data) is also referred to as a 1 unit interval (UI). FIG. 3 also shows an example of a pull-up type POD.

Figure 3:
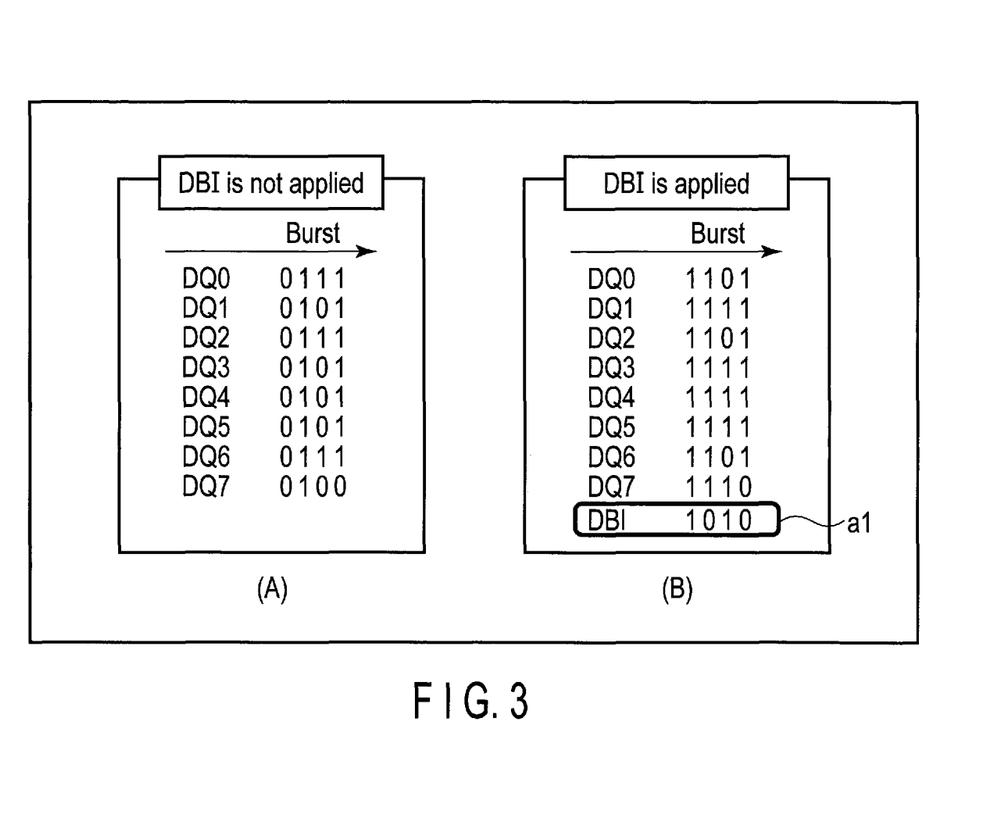
FIG. 3 is a diagram for explaining an overview of DBI for further saving power in the POD to which the memory system according to the embodiment is applied.

In FIG. 3, (A) shows data ("0" or "1") transferred through each of the data signal lines DQ0 to DQ7 when the DBI function is not applied to data to be transmitted. In FIG. 3, (B) shows data transferred through each of the data signal lines DQ0 to DQ7 when the DBI function is applied to the same data as the data to be transmitted in (A) of FIG. 3.

Assume that data items listed four by four in the horizontal direction in (A) and (B) of FIG. 3 are transferred in order from right to left by each of the data signal lines DQ0 to DQ7. For example, when the DBI function shown in (A) of FIG. 3 is not applied, the data signal line DQ0 transfers data "1" at the first UI and then "1", "1" and "0" are transferred in this order. In FIG. 3, "Burst" represents the order of data transfer.

In the example shown in (A) of FIG. 3, seven items of data "1" and one item of data "0" are transferred at the first UI by the data signal lines DQ0 to DQ7. That is, data "1" are transferred more than data "0". At the second UI, three items of data "1" and five items of data "0" are transferred. That is, data "0" are transferred more than data "1". In addition, data "1" dominates the third UI and data "0" dominates the fourth UI.

As described above, in the pull-up type, the voltage value of a data signal line need not be adjusted when data "1" are transferred. It is thus preferable that the number of items of data "1" transferred by the data signal lines DQ0 to DQ7 be larger than that of items of data "0" from the viewpoint of power saving.

Therefore, as shown in (B) of FIG. 3, when the DBI function is applied, the logic of data transferred by each of the data signal lines DQ0 to DQ7 is inverted at the second UI and the fourth UI dominated by data "0". Hereinafter, "logic of data is inverted" is also simply referred to as "data are inverted". DBI data (al) including flag data indicating whether or not data are inverted (Yes="1" and No="0") is created and supplied to the other device with the same timing (UI) as each data. The other device decodes the DBI data to determine whether or not each data is inverted, and inverts the data transferred at the second UI and the fourth UI. Thus, the receiving side can obtain data to be originally transmitted shown in (A) of FIG. 3.

If the DBI data are transferred on the same clock edge in parallel with the data transferred through the data signal lines DQ0 to DQ7 as shown in (B) of FIG. 3, it is necessary to add a new data signal line for the DBI data. The memory system 1 of the present embodiment does not require any additional new data signal line for a function whose concept is similar to that of the DBI function, which will be described below.

Figure 4:
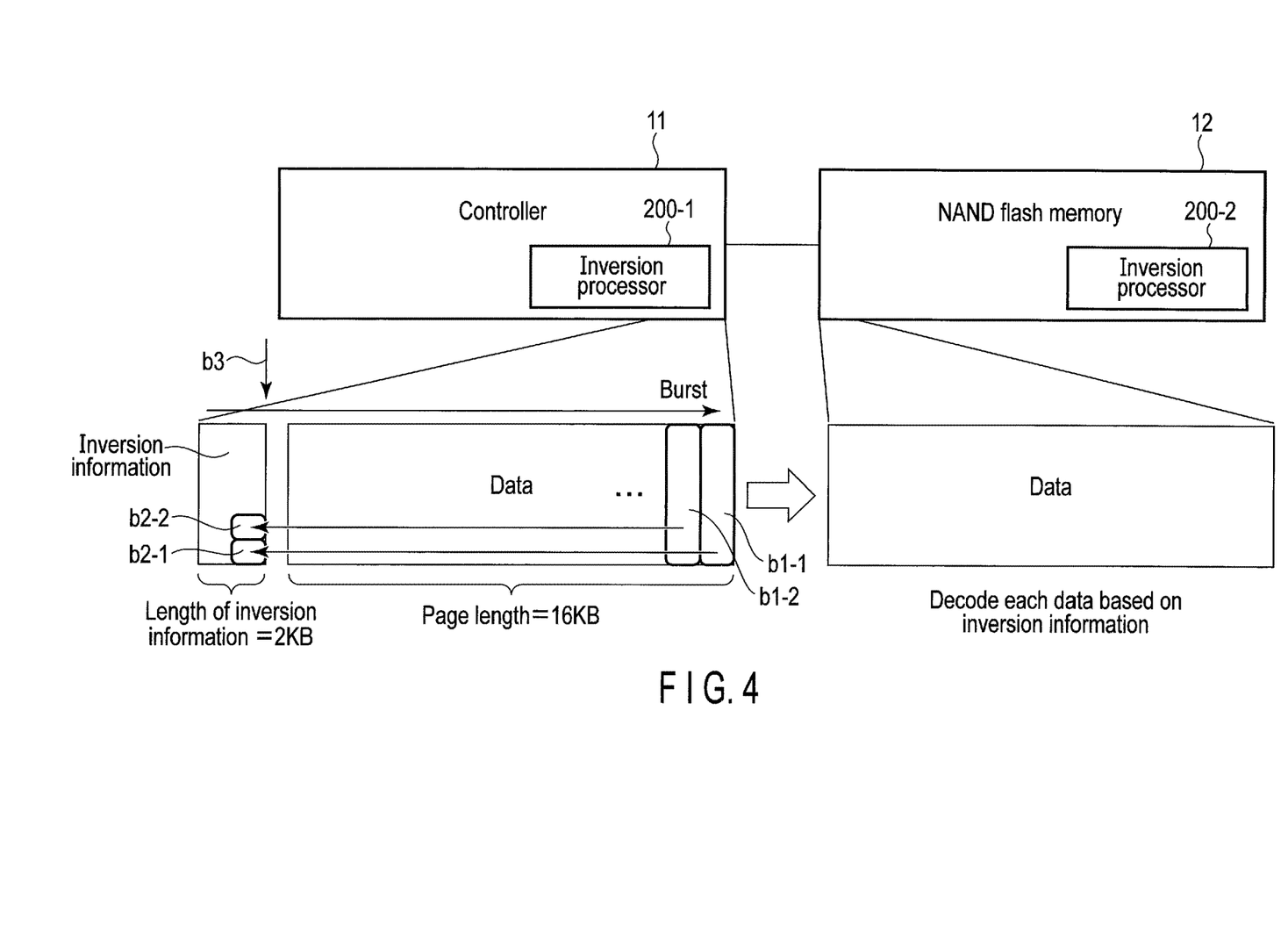
FIG. 4 is a diagram for explaining an overview of functions of the memory system according to the embodiment.

FIG. 4 is a diagram for explaining an overview of a function of the memory system 1 according to the present embodiment.

Here is a description of an example will be described in which the controller 11 and the NAND memory 12 transmit and receive data by 8 bits (1 byte) per 1 UI using eight data signal lines. FIG. 4 also shows a case where the controller 11 transmits data to the NAND memory 12 (when the NAND memory 12 receives data from the controller 11). That is, it shows a case where the inversion processor 200 (200-1) of the controller 11 inverts the logic of part of data, creates inversion information corresponding to the inverted logic, and provides it to the NAND memory 12. Based on the inversion information, the inversion processor 200 (200-2) of the NAND memory 12 inverts the logic of data received from the controller 11. The case where the NAND memory 12 transmits data to the controller 11 (when the controller 11 receives data from the NAND memory 12) will not be described because the inversion processor 200-2 of the NAND memory 12 has only to perform the process of the inversion processor 200-1 of the controller 11 as described below.

The inversion processor 200-1 (of the controller 11) creates, for example, inversion information for each transmit data of the size corresponding to a page that is a unit of processing for the NAND memory 12 (memory module 122). Then, the inversion processor 200-1 transmits the created inversion information to the NAND memory 12 as attribute information of transmit data for one page, using eight data signal lines, like the transmit data for one page. Note that the transmit data may also be referred to as receive data from the viewpoint of the NAND memory 12.

In FIG. 4, reference symbol b1-1 denotes 8-bit (1-byte) transmit data to be transferred at the first UI in the transmit data for one page. Reference symbol b2-1 denotes flag data in the inversion information indicating the presence or absence of inversion of 8-bit (1-byte) transmit data to be transferred at the first UI. Similarly, reference symbol b1-2 denotes 8-bit (1-byte) transmit data to be transferred at the second UI in the transmit data for one page, and reference symbol b2-2 denotes flag data in the inversion information indicating the presence or absence of inversion of 8-bit (1-byte) transmit data to be transferred at the second UI.

For example, when one page is 16 Kbytes, transmit data for one page is transferred at (16×1024×8)/8=16K UI. The inversion processor 200-1 thus creates inversion information including 16K items of flag data for the transmit data for one page. When each flag data is composed of one bit, the size of inversion information corresponding to transmit data for one page is 2 Kbytes. The 2-Kbyte inversion information can be transmitted at 16K/8=2K UI.

In the memory system 1 of the present embodiment, 2-Kbyte inversion information for the transmit data of one page that is 16 Kbytes is transmitted using eight data signal lines for data transmission and reception, thus making it unnecessary to add a new data signal line for the inversion function whose concept is similar to that of the DBI function. In other words, an inversion function whose concept is similar to that of the DBI function is achieved, without adding a new data signal line, by expanding 16-Kbyte transmit data by 2 Kbytes in the column direction (burst direction in FIG. 4), that is, by adding 2-Kbyte attribute information (inversion information).

In the case shown in FIG. 4, the inversion processor 200-2 of the NAND memory 12 receives inversion information using eight data signal lines for data transmission and reception, and executes control to invert the logic of part of the receive data corresponding to the received inversion information.

Note that the arrangement of flag data in the inversion information has only to be predetermined so that its recognition can be shared between the controller 11 and the NAND memory 12, and it is not limited to the arrangement shown in FIG. 4. As shown in FIG. 4, furthermore, the inversion information is not always transmitted following the corresponding transmit data, but also may be transmitted in advance of the corresponding transmit data. Accordingly, the NAND memory 12 can set whether or not transmit data to be received is inverted before it is decoded. In FIG. 4, reference symbol b3 denotes a column address indicating a UI at which the transfer of inversion information is started. This column address is determined in advance such that inversion information is appropriately exchanged between the controller 11 and the NAND memory 12.

Figure 5:
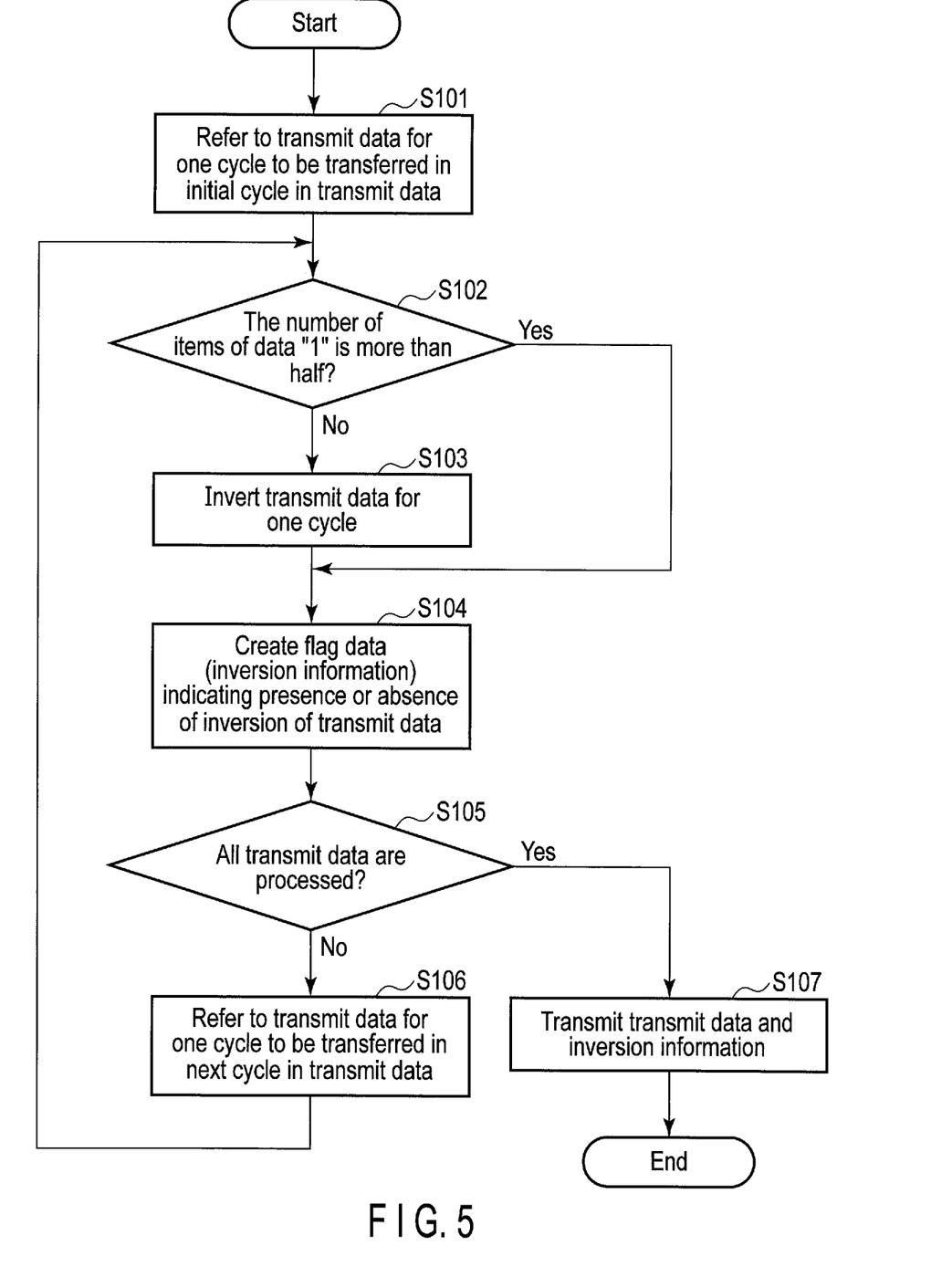
FIG. 5 is a flowchart showing a process of a function of a data transmission side in the memory system according to the embodiment.

FIG. 5 is a flowchart showing a process of the inversion function on the data transmission side in the memory system 1 according to the present embodiment. Here is a description of a flow of the process of the controller 11 that transmits data to the NAND memory 12, which is shown in FIG. 4. The inversion processor 200 described with reference to FIG. 4 is the inversion processor 200-1 included in the memory system 1.

The inversion processor 200 refers to 1-UI transmit data transferred at the initial UI in the transmit data (S101). The inversion processor 200 determines whether or not the transmit data transferred on the clock edge includes data "1" more than half (S102). When the POD (pull-down type) is applied, the inversion processor 200 determines whether or not it includes data "0" more than half.

For example, when transmit data are transferred by 8 bits (1 byte) per 1 UI through eight data signal lines, the inversion processor 200 determines whether or not the number of items of data "1" is 4 or more in step S102. When the number is not more than half (No in step S102), the inversion processor 200 inverts the 1-UI transmit data (step S103). On the other hand, when the number is more than half (Yes in step S102), the inversion processor 200 does not invert the 1-UI transmit data. When the number of items of data "0" and the number of items of data "1" are equal, no transmit data are inverted because the number of items of data "1" is more than half.

The inversion processor 200, which has determined whether or not transmit data are inverted, creates flag data indicating whether or not the transmit data are inverted (step S104). When the process of steps S102 to S104 is performed for the 1-UI transmit data, the inversion processor 200 determines whether or not all the transmit data has been processed (step S105). That is, the inversion processor 200 determines whether or not the last-processed 1-UI transmit data are 1-UI transmit data to be transferred on the final clock edge.

When not all transmit data are processed, that is, when unprocessed transmit data remain (No in step S105), the inversion processor 200 refers to 1-UI transmit data to be transferred on the next clock edge in the transmit data (step S106) and performs the process of steps S102 to S104 for the 1-UI transmit data. On the other hand, when all transmit data are processed (Yes in step S105), the NAND interface module 113 of the controller 11 transmits the transmit data and the inversion information including the flag data created by the inversion processor 200 in step S104 to the NAND memory 12 (step S107).

Figure 6:
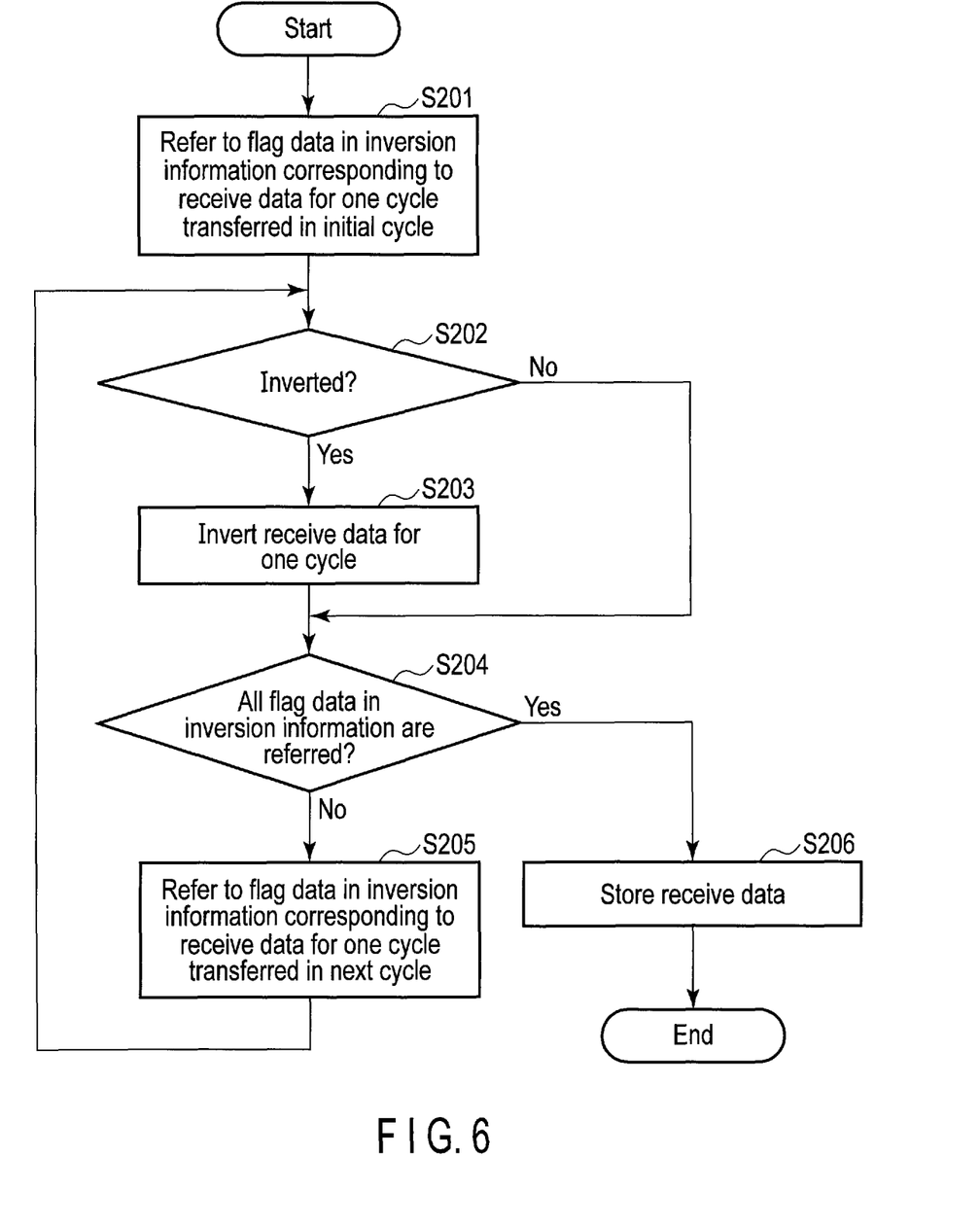
FIG. 6 is a flowchart showing a process of a function of a data reception side in the memory system according to the embodiment.

FIG. 6 is a flowchart showing a process of the inversion function on the data transmission side in the memory system 1 according to the present embodiment. Here is a description of a flow of the process of the NAND memory 12 that receives data from the controller 11, which is shown in FIG. 4. The inversion processor 200 described with reference to FIG. 6 is the inversion processor 200-2 included in the NAND memory 12.

The inversion processor 200 refers to flag data in the inversion information, which correspond to the 1-UI receive data transferred on the initial clock edge (step S201). The inversion processor 200 determines whether or not the flag data indicate that the 1-UI receive data are inverted (step S202). When it are inverted (Yes in step S202), the inversion processor 200 inverts the 1-UI receive data (step S203). On the other hand, when it are not inverted (No in step S202), the inversion processor 200 does not invert the 1-IU receive data.

When the inversion processor 200 performs the process of steps S202 to S203 for the 1-UI receive data, it determines whether or not it has referred to all the flag data in the inversion information (step S204). That is, the inversion processor 200 determines whether or not the last-referenced flag data corresponds to the 1-UI receive data to be transferred on the final clock edge.

When not all flag data are referred to, that is, when unreferenced flag data remain (No in step S204), the inversion processor 200 refers to flag data in the inversion information, which corresponds to the 1-UI receive data transferred on the next clock edge (step S205) and performs the process of steps S202 to S204 for the 1-UI receive data. On the other hand, when all flag data in the inversion information are referred to (Yes in step S204), the I/O module 121 of the NAND memory 12 causes the memory module 122 to store the receive data inverted by the inversion processor 200 in step S203 and the receive data not inverted in step S203 (step S206).

As described above, the memory system 1 of the present embodiment transmits the inversion information as attribute information of the transmit data using the signal lines for data transmission and reception, thus making it unnecessary to add a new data signal line for the inversion function whose concept is similar to that of the DBI function.

Note that FIG. 4 shows an example of creating one item of inversion information for transmit data for one page. The rate at which inversion information is created can be set variously.

Figure 7:
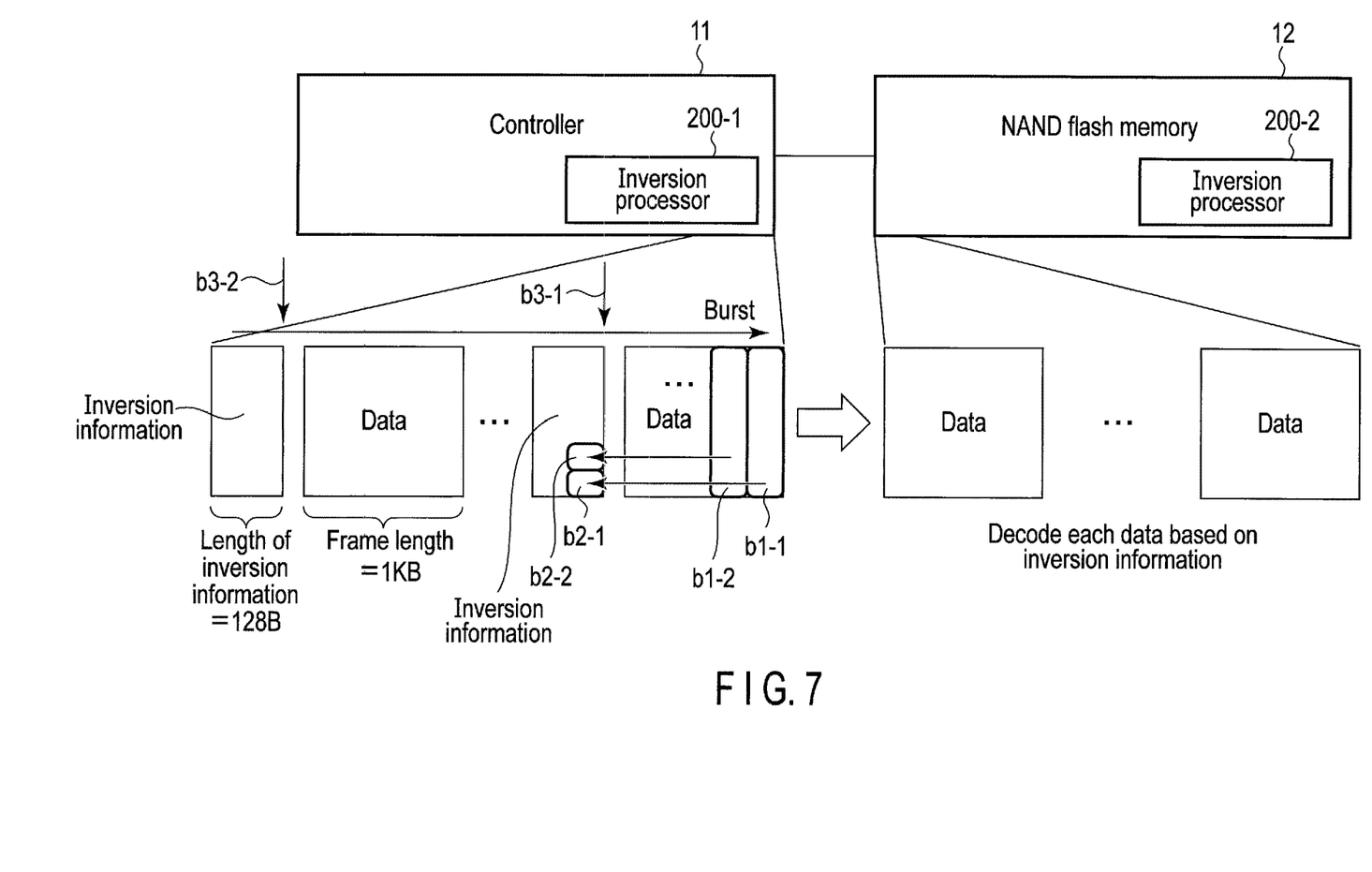
FIG. 7 is a diagram for explaining a first modification of the memory system according to the embodiment, which differs in granularity for creating inversion information.

FIG. 7 shows an example in which the inversion processor 200-1 of the controller 11, which transmits data to the NAND memory 12, creates inversion information for each transmit data whose size corresponds to a frame that is a unit of data transfer between the controller 11 and the NAND memory 12. In this example, when the NAND memory 12 transmits data to the controller 11, the inversion processor 200-2 of the NAND memory 12 also creates one item of inversion information for transmit data for one frame.

In FIG. 7, reference symbol b1-1 denotes 8-bit (1-byte) transmit data to be transferred at the first UI in the transmit data for one frame. Reference symbol b2-1 denotes flag data in the inversion information indicating the presence or absence of inversion of 8-bit (1-byte) transmit data to be transferred at the first UI. Similarly, reference symbol b1-2 denotes 8-bit (1-byte) transmit data to be transferred at the second UI in the transmit data for one frame, and reference symbol b2-2 denotes flag data in the inversion information indicating the presence or absence of inversion of 8-bit (1-byte) transmit data to be transferred at the second UI.

When one frame is 1 Kbyte, transmit data for the one frame is transferred at a 1024 UI. The size of inversion information in this case is therefore 128 bytes, and the inversion information is transferred at a 128 UI. In this example, a column address (b3-1, b3-2) representing a clock edge at which the transfer of inversion information is started is so predetermined that the inversion information is appropriately transferred between the controller 11 and the NAND memory 12.

Figure 8:
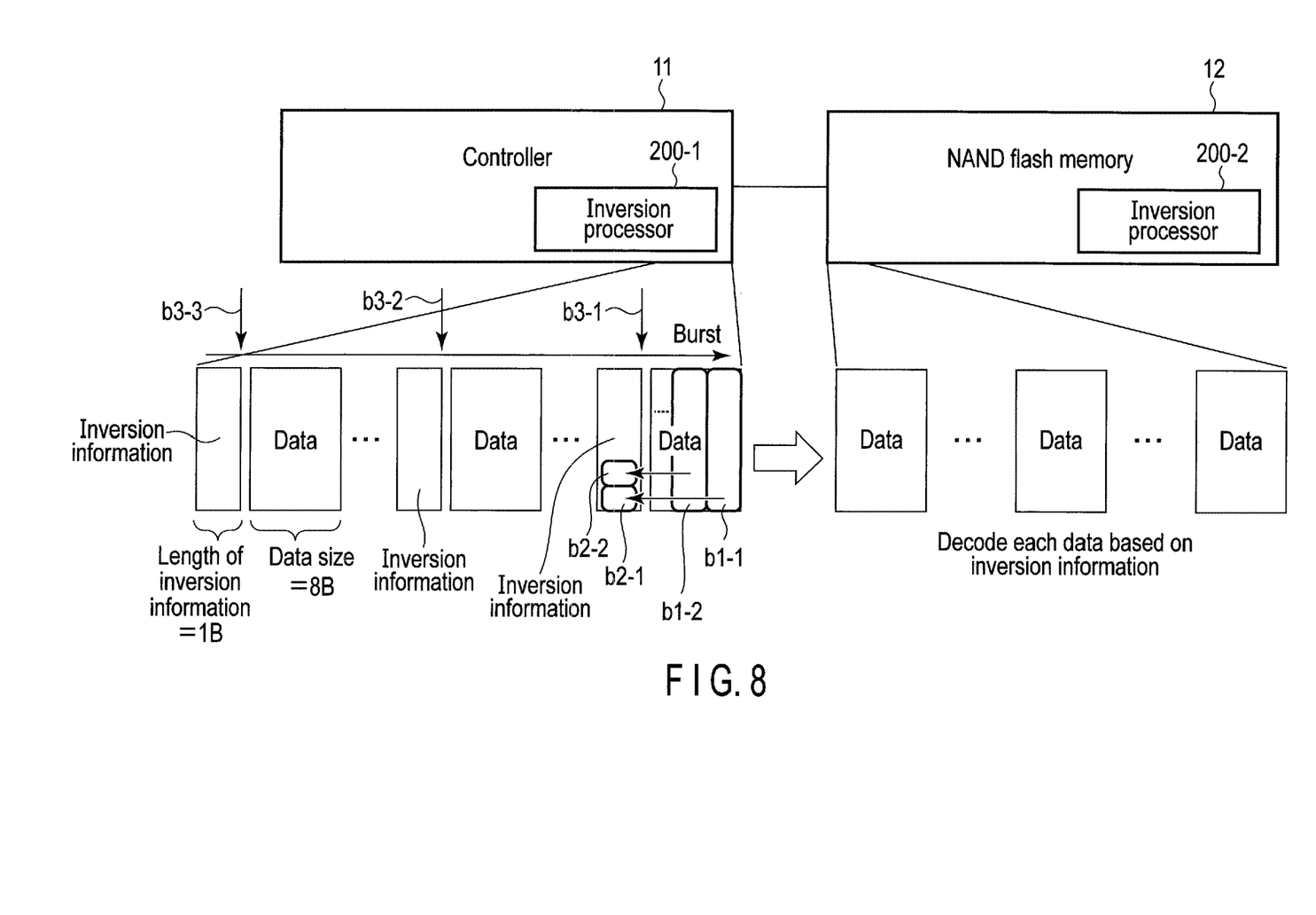
FIG. 8 is a diagram for explaining a second modification of the memory system according to the embodiment, which further differs in granularity for creating inversion information.

FIG. 8 shows an example in which the inversion processor 200-1 of the controller 11, which transmits data to the NAND memory 12, creates inversion information for each transmit data whose size corresponds to the amount of data transfer per 1 UI. That is, FIG. 8 shows an example of creating inversion information for each transmit data of 8 bytes to be transferred on eight clock edges the number of which is equal to that of eight data signal lines DQ0 to DQ7. In this example, when the NAND memory 12 transmits data to the controller 11, the inversion processor 200-2 of the NAND memory 12 also creates one item of inversion information for 8-byte transmit data.

In FIG. 8, reference symbol b1-1 denotes 8-bit (1-byte) transmit data to be transferred at the first UI in the 8-byte transmit data. Reference symbol b2-1 denotes flag data in the inversion information indicating the presence or absence of inversion of 8-bit (1-byte) transmit data to be transferred at the first UI. Similarly, reference symbol b1-2 denotes 8-bit (1-byte) transmit data to be transferred at the second UI in the 8-byte transmit data, and reference symbol b2-2 denotes flag data in the inversion information indicating the presence or absence of inversion of 8-bit (1-byte) transmit data to be transferred at the second UI.

In this example, a column address (b3-1, b3-2, b3-3) representing a clock edge at which the transfer of inversion information is started is so predetermined that the inversion information is appropriately transferred between the controller 11 and the NAND memory 12.

In all the examples shown in FIGS. 4, 7 and 8, for example, the total size of inversion information created for transmit data for each page is the same. The granularity at which the inversion information is transmitted and received can be adjusted depending on which of the examples is applied.

The foregoing description has been made concerning an example of determining necessity for inversion for each 8-bit (1-byte) transmit data to be transferred on each clock edge using the data signal lines DQ0 to DQ7 to create flag data. That is, an example has been described in which transmit data items for 1 UI with the same transmit timing are processed as one group, which is general in the DBI function. In the memory system 1 of the present embodiment, which does not transfer inversion information on the same clock edge as the transmit data but transmits the inversion information as attribute information, it is possible to process, as one group, a predetermined number of items of transmit data to be continuously transferred at a plurality of UTs through each of the data signal lines DQ0 to DQ7, determine necessity for inversion, and create flag data.

Figure 9:
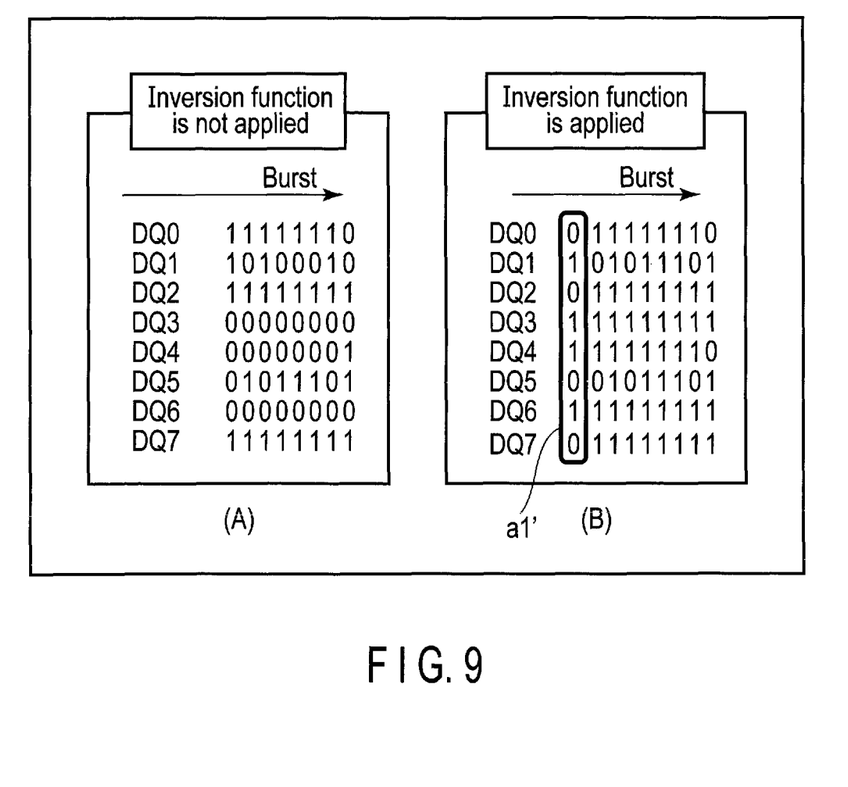
FIG. 9 is a diagram for explaining an example of creating inversion information in the memory system according to the embodiment.

Referring to FIG. 9, a description will be given regarding an example in which necessity for inversion is determined for each continuous 8-bit data to be transferred at 8 UIs through the data signal lines DQ0 to DQ7 to create flag data (inversion information) indicating the presence or absence of inversion.

In FIG. 9, (A) shows data ("0" or "1") to be transferred through each of the data signal lines DQ0 to DQ7 when the inversion function is not applied. In FIG. 9, (B) shows data to be transferred through each of the data signal lines DQ0 to DQ7 when the inversion function is applied to the same data as data to be transmitted in (A) of FIG. 9.

In the example shown in (A) of FIG. 9, one item of data "0" and seven items of data "1" are transferred at 8 UIs through the data signal line DQ0. That is, data "1" are transferred more than data "0". Five items of data "0" and three items of data "1" are transferred through the data signal line DQ1. That is, data "0" are transferred more than data "1".

As described above, in the case of the POD (pull-up type), data to be transferred through the data signal lines DQ0 to DQ7 is preferably "1" rather than "0". When the inversion function is applied, in the pull-up type, the transmit data of the data signal line DQ0 is not inverted but the transmit data of the data signal line DQ1 is inverted, as shown in (B) of FIG. 9. Then, for example, following each transmit data, "0" indicating the absence of inversion is transmitted as inversion information a1' through the data signal line DQ0, and "1" indicating the presence of inversion is transmitted as inversion information through the data signal line DQ01. In the case of the pull-down type, the transmit data of the data signal line DQ0 is inverted and the transmit data of the data signal line DQ1 has only to be inverted. Thus, "1" indicating the presence of inversion is transmitted as inversion information through the data signal line DQ0, and "0" indicating the absence of inversion has only to be transmitted as inversion information through the data signal line DQ01. The same applies to the data signal lines DQ2 to DQ7.

On the receiving side, the presence or absence of inversion for each continuous 8-bit receive data to be transferred at the 8 UIs through each of the data signal lines DQ0 to DQ7 is determined based on the inversion information to be transferred through each of the data signal lines DQ0 to DQ7, with the result that the original data to be transmitted shown in (A) of FIG. 9 can be obtained.

Figure 10:
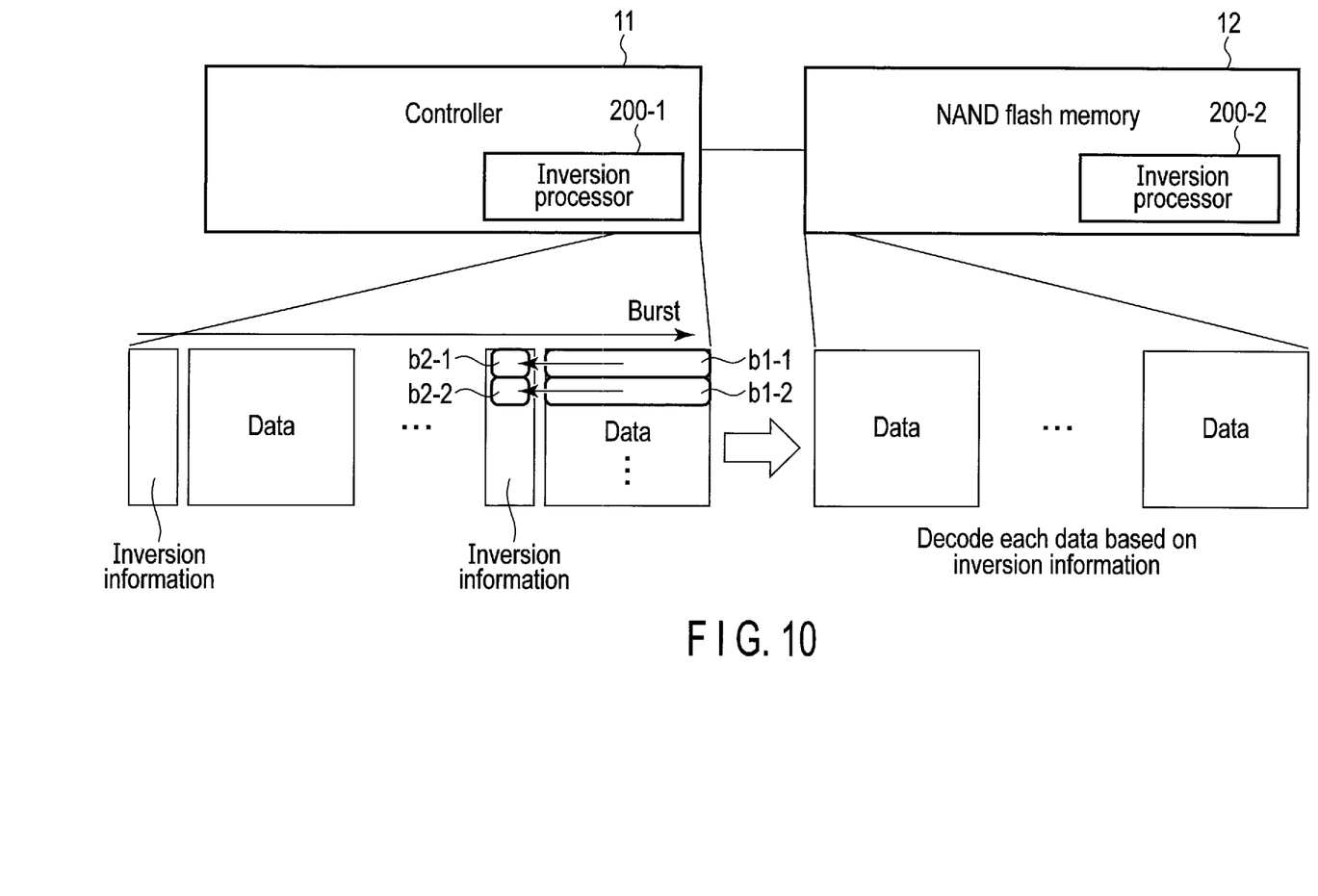
FIG. 10 is a diagram showing an example of transfer of inversion information in the memory system according to the embodiment.

FIG. 10 shows an example in which the inversion processor 200-1 of the controller 11, which transmits data to the NAND memory 12, creates inversion information for each data signal line and for every predetermined number of continuous items of transmit data. In this example, when the NAND memory 12 transmits data to the controller 11, the inversion processor 200-2 of the NAND memory 12 also creates inversion information for each data signal line and for every predetermined number of continuous items of transmit data.

In FIG. 10, reference symbol b1-1 denotes transmit data to be transferred continuously on a predetermined number of clock edges through a data signal line. Reference symbol b2-1 denotes flag data (inversion information) which indicate presence or absence of inversion of transmit data to be transferred continuously on a predetermined number of clock edges through the data signal line and which is transferred through the data signal line. Similarly, reference symbol b1-2 denotes transmit data to be transferred continuously on a predetermined number of clock edges through another data signal line. Reference symbol b2-2 denotes flag data (inversion information) which indicate the presence or absence of inversion of transmit data to be transferred continuously on a predetermined number of clock edges through the data signal line and which is transferred through the data signal line.

The foregoing example makes it possible to optionally set whether or not inversion information is created by determining necessity for inversion for each transmit data of how many UIs to be transferred through each data signal line. Furthermore, in this example, the size of each inversion information created for the transmit data of a predetermined size (number) is a fixed value of the number (1 byte) corresponding to the data signal line, and the total size of the inversion information varies according to the setting of how many UIs are used for transmission data to create the inversion information. That is, the ratio of inversion information to transmission data can be adjusted.

In this example, if the inversion information is transmitted using a data signal line for data transmission and reception, it is unnecessary to add a new data signal line for the inversion function whose concept is similar to that of the DBI function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a storage device;
and a controller configured to control data write to the storage device and data read from the storage device based on a request from a host device, wherein
the controller is configured to:
maintain or invert logic of a first data item that is included in transmit data to be transferred to the storage device by N bits per 1 unit interval (UI) through N data signal lines (N is a natural number of one or more);
create second data including plural data items each indicating presence or absence of inversion of the logic of each of a plurality of the first data items; and
transfer to the storage device, the plurality of the first data items and the second data through the N data signal lines, the second data being transferred sequentially with the first data items;
wherein the storage device is configured to receive the first data items and the second data through the N data signal lines, determine presence or absence of inversion of logic of the received first data items based on the received second data, and maintain or invert the logic of the first data items.

2. The memory system of claim 1, wherein the controller is configured to determine necessity for inversion of logic for each N-bit third data to be transferred at a same UI as the first data items to create second data including a plurality of items of flag data each indicating presence or absence of inversion of the third data.

3. The memory system of claim 1, wherein the controller is configured to determine necessity for inversion of logic for each M-bit fourth data to be transferred on M clock edges (M is a natural number of one or more) as the first data items through each of the N data signal lines to create second data including a plurality of items of flag data each indicating presence or absence of inversion of the fourth data.

4. The memory system of claim 3, wherein the second data are allocated such that each of the plurality of items of flag data is transferred through a data signal line that is the same as a data signal line for corresponding data of the M-bit fourth data, respectively.

5. The memory system of claim 1, wherein the controller is configured to create the plural data items in the second data for each fifth data having size corresponding to a unit of processing for a storage area of the storage device as the first data items.

6. The memory system of claim 1, wherein the controller is configured to create the plural data items in the second data for each sixth data having size corresponding to a unit of processing for data transfer between the controller and the storage device as the first data items.

7. The memory system of claim 1, wherein the controller is configured to create the plural data items in the second data for each seventh data having size to be transferred on N clock edges the number of which is equal to that of the N data signal lines as the first data items.

8. The memory system of claim 1, wherein
the storage device is configured to:
maintain or invert logic of an eighth data item that is included in transmit data to be transferred to the controller by N bits per 1 UI through the N data signal lines;
create ninth data including plural data items each indicating presence or absence of inversion of logic of each of a plurality of the eighth data items; and
transfer to the controller, the plurality of the eighth data items and the ninth data through the N data signal lines, the ninth data being transferred sequentially with the eighth data items.

9. A controller comprising: P1 N terminals (N is a natural number of one or more) connectable to N data signal lines to output transmit data by N bits per 1 unit interval (UI); and
a circuit configured to maintain or invert logic of a first data item that is included in the transmit data, create second data including plural data items each indicating presence or absence of inversion of the logic of each of a plurality of the first data items, and output the plurality of the first data items and the second data from the N terminals, the second data being transferred sequentially with the first data items;
wherein the circuit is configured to create the plural data items in the second data for each seventh data having size to be output on N clock edges the number of which is equal to that of the N data signal lines as a part of the first data items.

10. The controller of claim 9, wherein the circuit is configured to determine necessity for inversion of logic for each N-bit third data to be output at a same UI as the first data items to create second data including a plurality of items of flag data each indicating presence or absence of inversion of the third data.

11. The controller of claim 9, wherein the circuit is configured to determine necessity for inversion of logic for each M-bit fourth data to be output on M clock edges (M is a natural number of one or more) as the first data items through each of the N data signal lines to create second data including a plurality of items of flag data each indicating presence or absence of inversion of the fourth data.

12. The controller of claim 9, wherein the circuit is capable of connecting to a storage device and configured to create the plural data items in the second data for each fifth data having size corresponding to a unit of processing for a storage area of the storage device as the first data item, or to create the second data for each sixth data having size corresponding to a unit of processing for data transfer between the controller and the storage device as a part of the first data items.

13. A data transfer method of an electronic device configured to transfer transmit data to an external device by N bits per 1 unit interval (UI) through N data signal lines (N is a natural number of one or more), the method comprising:
maintaining or inverting logic of a first data item that is included in the transmit data;
creating second data including plural data items each indicating presence or absence of inversion of the logic of each of a plurality of the first data items;
transferring to the external device, the plurality of the first data items and the second data through the N data signal lines, the second data being transferred sequentially with the first data items;
and creating the plural data items in the second data for each seventh data having size to be transferred on N clock edges the number of which is equal to that of the N data signal lines as the first data items.

14. The data transfer method of claim 13, further comprising determining necessity for inversion of logic for each N-bit third data to be transferred at a same UI as the first data items to create second data including a plurality of items of flag data each indicating presence or absence of inversion of the third data.

15. The data transfer method of claim 13, further comprising determining necessity for inversion of logic for each M-bit fourth data to be transferred on M clock edges (M is a natural number of one or more) as the first data items through each of the N data signal lines to create second data including a plurality of items of flag data each indicating presence or absence of inversion of the fourth data.

16. The data transfer method of claim 15, wherein the second data are allocated such that each of the plurality of items of flag data is transferred through a data signal line that is the same as a data signal line for corresponding data of the M- bit fourth data, respectively.

17. The data transfer method of claim 13, further comprising creating the plural data items in the second data for each fifth data having size corresponding to a unit of processing for a storage area of the external device as the first data items, or creating the plural data items in the second data for each sixth data having size corresponding to a unit of processing for data transfer between the controller and the external device as the first data items.

* * * * *